(12) United States Patent
He et al.

(10) Patent No.: US 9,378,760 B2
(45) Date of Patent: Jun. 28, 2016

(54) DATA READER WITH TUNED MICROSTRUCTURE

(71) Applicant: Seagate Technology LLC, Cupertino, CA (US)

(72) Inventors: Qing He, Plymouth, MN (US); Mark William Covington, Edina, MN (US); Mark Thomas Kief, Lakeville, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/447,910

(22) Filed: Jul. 31, 2014

(65) Prior Publication Data
US 2016/0035376 A1 Feb. 4, 2016

(51) Int. Cl.
*G11B 5/33* (2006.01)
*G11B 5/64* (2006.01)
*G11B 5/39* (2006.01)

(52) U.S. Cl.
CPC .............. *G11B 5/3906* (2013.01); *G11B 5/332* (2013.01)

(58) Field of Classification Search
USPC ................ 235/375, 449; 428/827, 3; 360/125
See application file for complete search history.

(56) References Cited

U.S. PATENT DOCUMENTS

| 4,103,315 A | 7/1978 | Hempstead et al. |
| 4,478,877 A | 10/1984 | Krevet et al. |
| 5,487,356 A | 1/1996 | Li et al. |
| 5,590,389 A | 12/1996 | Dunlop et al. |
| 5,948,553 A | 9/1999 | Kamijo |
| 6,110,542 A | 8/2000 | Miyanaga et al. |
| 6,139,951 A | 10/2000 | Chen et al. |
| 6,245,451 B1 | 6/2001 | Kamisawa et al. |
| 6,342,311 B1 | 1/2002 | Inturi et al. |
| 6,361,627 B1 | 3/2002 | DeHaven et al. |
| 6,524,956 B1 | 2/2003 | Tian et al. |
| 6,636,460 B2 | 10/2003 | Akiyama et al. |
| 6,740,397 B1 | 5/2004 | Lee |
| 6,778,358 B1 | 8/2004 | Jiang et al. |
| 6,791,796 B2 | 9/2004 | Shukh et al. |
| 6,908,517 B2 | 6/2005 | Segal |

(Continued)

FOREIGN PATENT DOCUMENTS

| JP | 63-311613 | 12/1988 |
| JP | 2002-151760 A | 5/2002 |

(Continued)

OTHER PUBLICATIONS

R. L. Anderson, et al., "Annealing Behavior of Electroplated Permalloy Thin Films," Journal of Electronic Materials, 1973, pp. 161, vol. 2, No. 2, American Institute of Mining, Metallurgical, and Petroleum Engineers, Inc.

(Continued)

*Primary Examiner* — Daniel Hess
(74) *Attorney, Agent, or Firm* — Hall Estill Attorneys at Law

(57) ABSTRACT

A data reader may be configured with a tuned microstructure by initially cooling a substrate to a temperature of 100K or lower and subsequently depositing at least one layer of a data reader on the substrate while the substrate is maintained at the temperature. The tuned microstructure may consist of at least a grain size, grain size distribution, interface quality between multiple layers of the data reader, resistance-area product, and magnetoresistance.

18 Claims, 4 Drawing Sheets

(56) References Cited

U.S. PATENT DOCUMENTS

| | | | |
|---|---|---|---|
| 7,488,609 B1 * | 2/2009 | Lin | B82Y 10/00 257/E21.663 |
| 8,064,161 B2 | 11/2011 | Kudo et al. | |
| 8,619,394 B1 | 12/2013 | Park et al. | |
| 2001/0021537 A1 | 9/2001 | Shimazawa | |
| 2002/0054462 A1 | 5/2002 | Sun et al. | |
| 2003/0091871 A1 | 5/2003 | Yamazaki et al. | |
| 2008/0253024 A1 | 10/2008 | Miyata et al. | |
| 2009/0162948 A1 | 6/2009 | Henrichs | |
| 2009/0289270 A1 | 11/2009 | Hanawa et al. | |
| 2012/0164486 A1 | 6/2012 | Bonhote et al. | |
| 2013/0288078 A1 | 10/2013 | Zhu et al. | |

FOREIGN PATENT DOCUMENTS

| | | |
|---|---|---|
| JP | 2004-295987 A | 10/2004 |
| JP | 2007-173476 A | 7/2007 |
| KR | 10-2010-0043146 | 4/2010 |

OTHER PUBLICATIONS

W. Bruckner, et al., "Evolution of stress and microstructure in NiFe (20 wt.%) thin films during annealing," Thin Solid Films 385, 2001, pp. 225-229, Elsevier Science B.V.

Liang Dong, et al., "Stress relaxation and misfit dislocation nucleation in the growth of misfitting films: A molecular dynamics simulation study," Journal of Applied Physics 83, Jan. 1998, pp. 217-227, American Institute of Physics.

T. Furubayashi, et al., "Structure and transport properties of current-perpendicular-to-plane spin valves using Co2FeAl0.5Si0.5 and Co2MnSi Heusler alloy electrodes," Journal of Applied Physics 107, 2010, pp. 0-7, American Institute of Physics.

De-Hua Han, "Stress effects on exchange coupling field, coercivity, and uniaxial anisotropy field of NiO/NiFe bilayer thin film for spin valves," Journal of Applied Physics 81, Apr. 1997, pp. 4519-4521, American Institute of Physics.

G. Herzer, "Grain Structure and Magnetism of Nanocrystalline Ferromagnets," IEEE Transactions on Magnetics, Sep. 1989, pp. 3327-3329, vol. 25, No. 5, IEEE.

D. W. Hoffman, "Perspective on stresses in magnetron-sputtered thin films," J. Vac. Sci, Technol. A 12(4), Jul./Aug. 1994, pp. 953-961, American Vacuum Society.

S. Ikeda, et al., "Tunnel magnetoresistance of 604% at 300K by suppression of Ta diffusion in CoFeB/MgO/CoFeB pseudo-spin-valves annealed at high temperature," Applied Physics Letters 93, 2008, pp. 0-3, American Institute of Physics.

V. R. Inturi, et al., "The effect of Nitrogen on Soft-Magnetism in FeTaN Films," IEEE Transactions on Magnetics, Nov. 1995, pp. 2660-2662, vol. 31, No. 6, IEEE.

H. S. Jung, et al., "FeTaN/IrMn Exchange-Coupled Multilayer Films as Soft Underlayers for Perpendicular Media," IEEE transactions on Magnetics, Jul. 2001, pp. 2294-2297, vol. 37, No. 4, IEEE.

Andrew S. Kao, et al., "Effect of Magnetic Annealing on Plated Permalloy and Domain Configurations in Thin-Film Inductive Head," IEEE Transactions on Magnetics, Nov. 1991, pp. 4452-4457, vol. 27, No. 6 IEEE.

R. Koch, "The intrinsic stress of polycrystalline and epitaxial thin metal films," J. Phys.: Conden. Matter 6, 1994, pp. 9519-9550, IOP Publishing Ltd., UK.

Ladislav Pust, et al., "Domain control in magnetic shields using patterned permanent magnet underlayer," Journal of Applied Physics, May 2002, pp. 6940-6942, vol. 91, No. 10, American Institute of Physics.

R. A. Ristau, et al., "On the relationship of high coercivity and L10 ordered phase in CoPt and FePt thin films," Journal of Applied Physics, Oct. 1999, pp. 4527-4533, vol. 86, No. 8, American Institute of Physics.

Shiyun Ruan, et al., "Kinetic Monte Carlo simulations of nanocrystalline film deposition," Journal of Applied Physics 107, 2010, pp. 1-11, American Institute of Physics.

\* cited by examiner

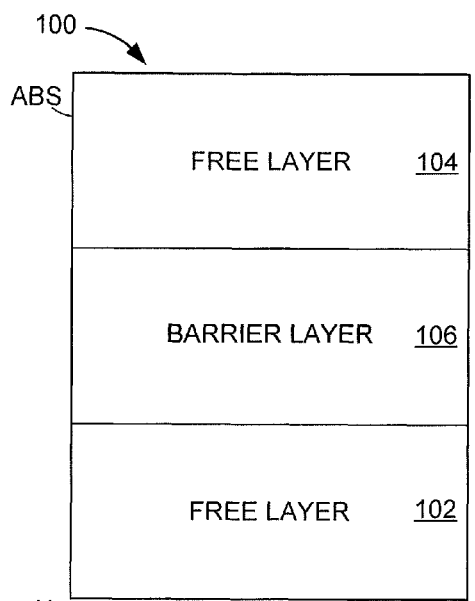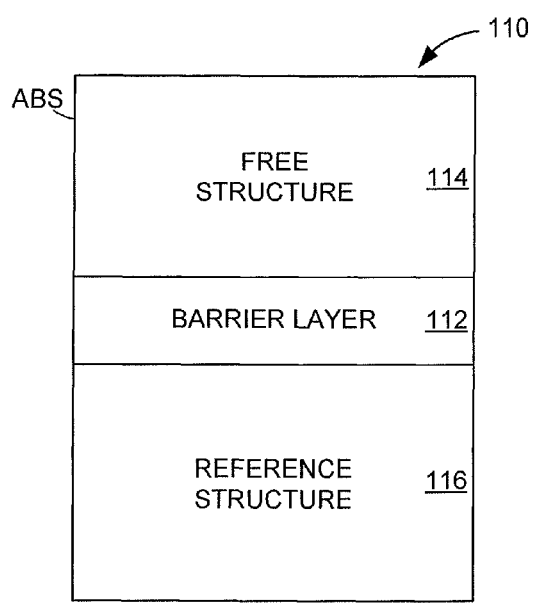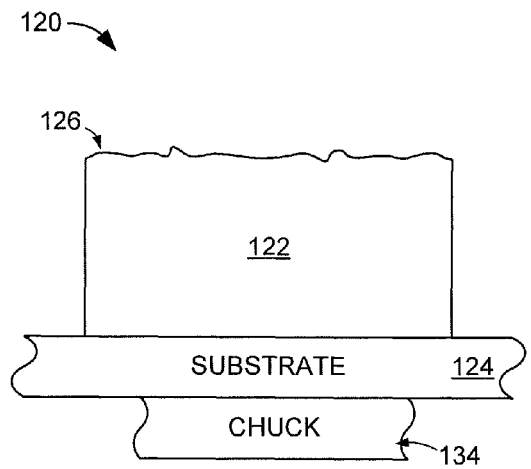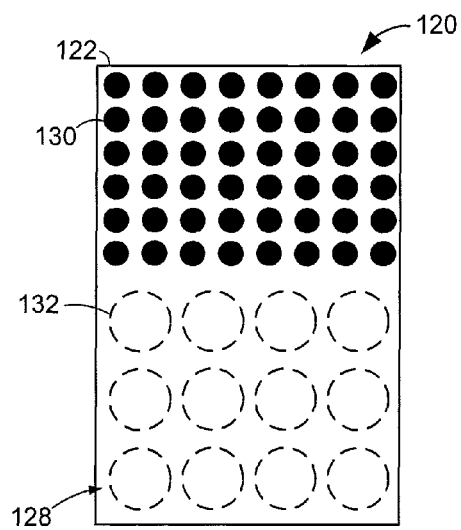

US 9,378,760 B2

DATA READER WITH TUNED MICROSTRUCTURE

SUMMARY

Assorted embodiments configure a data reader with a tuned microstructure by initially cooling a substrate to a temperature of 100K or lower and subsequently depositing at least one layer of a data reader on the substrate while the substrate is maintained at the temperature. The tuned microstructure may consist of at least a grain size, grain size distribution, interface quality between multiple layers of the data reader, resistance-area product, and magnetoresistance.

BRIEF DESCRIPTION OF THE DRAWINGS

FIGS. 1A and 1B respectively show block representations of portions of example data readers configured in accordance with various embodiments FIGS. 2A and 2B display top and side block representations of portions of an example data reader fabrication assembly in accordance with various embodiments.

DETAILED DESCRIPTION

Figure 3:
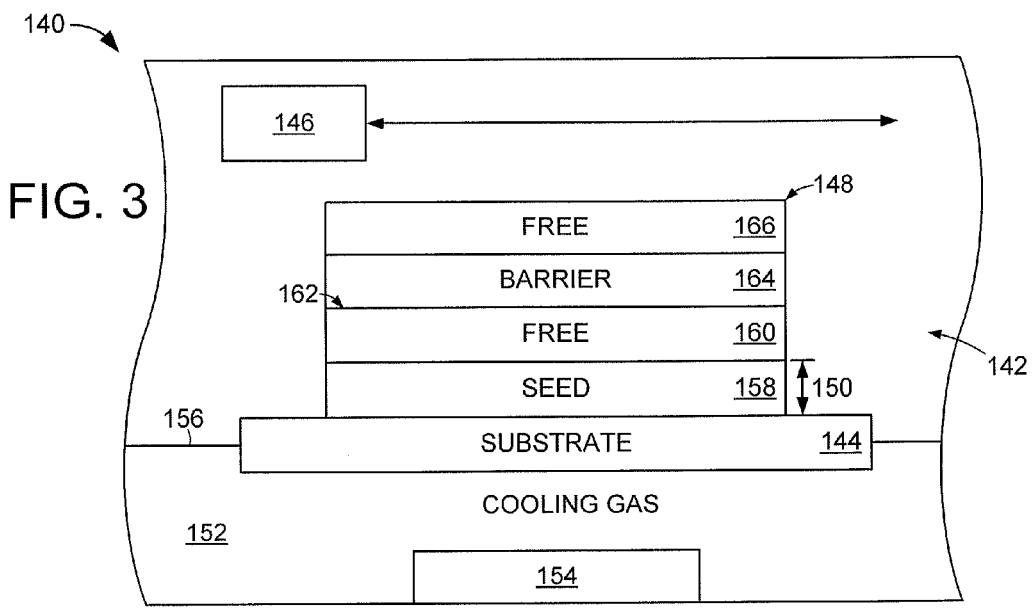
FIG. 3 illustrates a block representation of a portion of an example data reader fabrication system configured in accordance with some embodiments.

Increased consumer and industry demand for data storage devices with greater storage capacity and faster data access times has emphasized decreasing the physical size and proximity of data bits. It is contemplated that magnetic data readers that are sensitive to data bits can be configured with an MgO barrier layer that allows for physically smaller data bits that maintain acceptable magneto-resistance (MR) characteristics. However, data readers with reduced physical dimensions can experience inadvertent material intermixing, rough interface surfaces, and relatively large grain sizes that inhibit maintaining acceptable MR characteristics with any further reductions in data bit size.

Accordingly, a data reader may be constructed with a tuned microstructure by initially cooling a substrate to a temperature of 100K or lower and subsequently depositing at least one layer of a data reader on the substrate while the substrate is maintained at the temperature. The deposition of magnetic and non-magnetic data reader layers while the substrate is actively cooled to maintain the cryogenic temperature can optimize the tuned microstructure with at least a grain size, grain size distribution, interface quality between multiple layers of the data reader, and thereby the magnetoresistance, interlayer coupling, and resistance area product.

The maintenance of the substrate at a cryogenic temperature can allow one or more layers of the data reader to be deposited with reduced grain sizes and surface roughness compared to substrates that slightly cooled or room temperature when layers are deposited. Additionally, the ability to control the cryogenic temperature via contact with the cooling gas during material deposition can provide substrate temperature uniformity that can tune the grain size distribution and optimize the within-wafer and wafer-to-wafer uniformity of a data reader layer.

FIGS. 1A and 1B respectively illustrate block representations of portions of example magnetic stacks 100 and 110 that may be configured with reduced physical sizes and utilized in a data storage system in accordance with some embodiments. FIG. 1A displays an example trilayer magnetic stack 100 that can be characterized by first 102 and second 104 magnetically free layers separated by a non-magnetic barrier layer 106. The magnetically free layers 102 and 104 can be biased by a physically separated means that allows the layers to individually respond to encountered data bits without a fixed magnetic structure being present on an air bearing surface (ABS).

The magnetically free layers 102 and 104 may be similar or dissimilar sizes, thicknesses, and materials that can provide a physically small magnetic stack 100 area. In various embodiments, the barrier layer 106 comprises MgO, which allows MR values for the magnetic stack 100 to be maintained despite reduced resistance area product. An MgO material may also be used in the tunnel magnetoresistance (TMR) magnetic stack 110 of FIG. 1B as a barrier layer 112 that separates a magnetically free layer structure 114 from a fixed layer magnetization structure 116. In some embodiments, the free layer structure 114 consists of a single layer of material while other embodiments tune the free layer structure 114 as a lamination of multiple layers, which may be magnetic and non-magnetic materials, respectively.

The fixed layer magnetization structure 116 may be configured in a variety of different, non-limiting, configurations, but some embodiments employ a pinning layer, such as an antiferromagnetic material, to set a magnetization direction in pinned reference layers. The pinned and pinning layers may be configured to characterize the fixed layer magnetization structure 116 as a synthetic antiferromagnet (SAF) that utilizes antiferromagnetic coupling to provide a reference magnetization to which the sensed magnetization of the free layer 114 can be correlated to identify a programmed logical state.

Regardless of which type of magnetic stack 100 and 110 that is used in a data storage device, the grain size of magnetizations in the free layers 102, 104, and 114 can determine the accuracy and areal bit density capability of a data reader. FIGS. 2A and 2B respectively convey side and top view block representations of a portion of an example magnetic stack fabrication assembly 120 configured to construct at least one magnetic free layer 122 that may be incorporated into a magnetic stack in accordance with various embodiments.

FIG. 2A shows a side view of a magnetically free layer 122 that may be biased to a default magnetization, but is sensitive to encountered data bits. The free layer 122 can be constructed of magnetic alloys, like CoFe, CoFeB, and NiFe, that can be magnetically sensitive with a nanometer scale thickness, as measured along the Y axis. The material of the free layer 122 can correspond with a crystal structure, such as body-centered cubic (BCC), and lattice structure which correspond with the data reading performance of a free layer 122, magnetic stack, and data reader.

The deposition of materials on substrates 124 that are slightly cooled or at room temperature can produce an interface surface 126 with a uniform or non-uniform roughness, which may have large size and/or non-uniform magnetic grains in the magnetically free layer 122. That is, deposition of the free layer 122 material onto a room temperature substrate 124 can produce an interface surface 126 roughness that may inhibit the formation of ultra-fine magnetic grains in magnetic layers deposited onto the free layer 122. In some embodiments, the substrate 124 concurrently supports ~100,000 reader dies and potentially 1-10 separate data readers per die.

FIG. 2B depicts a top view of a portion of the magnetically free layer 122 and example magnetic grains 128 that are arranged in non-limiting patterns throughout the free layer 122. Solid circles 130 represent a grain size and position that can provide optimized performance in high areal bit density data storage environments. Conversely, segmented circles 122 represent example grain sizes and proximity to other grains for magnetic layers deposited onto an interface surface having a roughness above .2 nm. Thus, decreasing the physical size and proximity of grains 128 in the free layer 122 helps to increase magnetic resolution that can more precisely sense magnetic polarities of data bits having smaller physical sizes and heightened density on a data storage medium.

It is contemplated that a substrate 124 can be cooled to a relatively low temperature via contact with one or more chucks 134. Such substrate 124 cooling can decrease magnetic grain 128 size by freezing the microstructure of the free layer 122 material. However, cooling the substrate 124 ex-situ in relation to the deposition of the magnetically free layer 122 can induce process variability and inconsistent free layer 122 formation as the substrate 124 heats up in transit between contact with the cooling chuck 134 and a deposition chamber where the free layer 122 material can be deposited.

It is noted that a cooling chuck 134 may be implemented in a common chamber with the free layer deposition means, such as sputtering and physical vapor deposition (PVD). Yet, physical contact with the chuck 134 may not uniformly cool the substrate 124 to a temperature and instead can produce temperature gradients that can degrade magnetic performance of the free layer 122. That is, the chuck 134 may cool the substrate 124 concurrently with the deposition of the free layer 122, but such fabrication is imprecise as the substrate 124 can have non-uniform temperatures that correspond with a free layer 122 having non-uniform crystal structures, lattice structures, and grain sizes, which inhibits magnetic response and MR in a magnetic stack to the detriment of data reading performance.

With these issues in mind, FIG. 3 shows a block representation of a portion of an example data reader fabrication system 140 configured and operated in accordance with some embodiments. The reader fabrication system 140 can have a common chamber 142 in which at least one substrate 144 resides. The chamber 142 can be configured with one or more different types of material deposition means 146, such as sputtering and PVD means, which can statically and dynamically form at least one layer of a magnetic stack 148. It is noted that the various layers of the magnetic stack 148 may be selectively formed with different deposition means 146, materials, and thicknesses 150 with and without the substrate 144 being cooled.

In some embodiments, the substrate 144 is continuously cooled to a cryogenic temperature, such as 90K, through optimized heat transfer of a cooling gas 152, such as He, from the cold chuck 154 to the substrate 144. For example, a nozzle, jet, and orifice can pass cooling gas 152 into the common chamber 142 to contact the substrate 144 and increase heat transfer to provide faster substrate 144 cooling to a cryogenic temperature. Maintaining the cooling gas 152 between the chuck 154 and the substrate 144 can provide uniform substrate 144 temperatures and the ability to maintain the substrate 144 temperature in response to heat generated by the deposition of the various magnetic stack 148 layers.

The chamber 142, chuck 154, and deposition means 146 can be configured to operate concurrently, such as through a sealed bifurcation 156, so that the substrate 144 is simultaneously cooled on a bottom substrate surface while the magnetic stack 148 is deposited on a top substrate surface. Although the magnetic stack 148 may be formed with any number of layers and different materials, such as the trilayer 100 and TMR 110 magnetic stacks respectively shown in FIGS. 1A and 1B, various embodiments initially deposit a magnetic or non-magnetic seed layer 158 directly in contact with the substrate 144.

The seed layer 158 may have a tuned material and thickness construction that allows the subsequently deposited magnetically free layer 160 to have optimized magnetic characteristics, such as uniaxial anisotropy and a lattice structure. It is noted that the seed layer 158 is not required and can be omitted or replaced in accordance with assorted embodiments. Regardless of the insertion of a seed layer 158, the concurrent cooling of the substrate 144 to establish and maintain a cryogenic temperature along with the deposition of the magnetically free layer 160 can freeze the crystal structure of the free layer material and produce small grain size and reduced grain proximity compared to free layer deposition on a room temperature substrate or on a substrate that is not continuously cooled.

The formation of the magnetically free layer 160 while the substrate 144 is maintained at a cryogenic temperature by the cooling gas 152 may further produce a smooth interface surface 162 onto which a barrier layer 164 can be deposited with optimized magnetic characteristics. In comparison, a barrier layer 164 formed onto a relatively rough interface surface 162, such as the roughness shown in FIG. 2A, can experience material diffusion and intermixing between layers of the magnetic stack 148 that inhibit data reading performance by inducing magnetic asymmetry and ferromagnetic coupling between the first 160 and second 166 free layers of the magnetic stack 148.

Hence, the concurrent cooling of the substrate to cryogenic temperatures while the various layers of the magnetic stack 148 are deposited can provide tuned magnetic grain sizes and optimized data reading performance as magnetic asymmetry and ferromagnetic coupling across the barrier layer 164 is reduced due to at least smoother interface surfaces, less material diffusion, and less material intermixing. The ability to tune the substrate temperature during magnetic stack 148 material deposition further allows for optimization of data reading performance as the cooling gas 152 can be adjusted to customize substrate 144 temperature and substrate temperature uniformity to optimize magnetic characteristics of the various layers of the magnetic stack 148.

Figure 4:
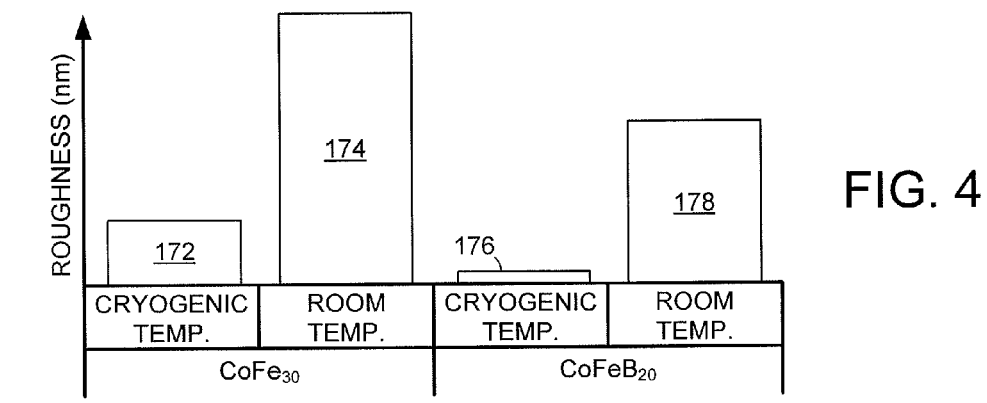
FIG. 4 provides example operational data showing the effect of in-situ cryo-cooling deposition on the roughness of single thin films, such as $CoFe_{30}$ and $CoFeB_{20}$.

Turning to the example structural data graphed in FIG. 4 that corresponds with data readers partially or completely deposited on a substrate actively maintained at a cryogenic temperature, such as 50K, or on a substrate at room temperature, such as 300K. Bar 172 represents how deposition of material onto a cryogenic substrate can have reduced grain size and grain size distribution to provide a reduced roughness. Bar 172 compares to bar 174 that illustrates how a room temperature substrate promotes higher material surface roughness for $CoFe_{30}$ magnetic materials.

Bars 176 and 178, which respectively represent cryogenic and room temperature substrates, show the difference in material surface roughness during $CoFeB_{20}$ material deposition. The contrast in material surface roughness for materials deposited on cryogenically cooled or room temperature substrates supports how the cryogenic temperature of a substrate can be tuned to produce a surface roughness, such as 0.25-0.35 nm. For example, a first data reader material can be deposited on a substrate at room temperature to provide a relatively rough interface and a second data reader material can be deposited atop the first material while the substrate is maintained at 50K to produce a relatively smoother surface roughness.

Figure 5:
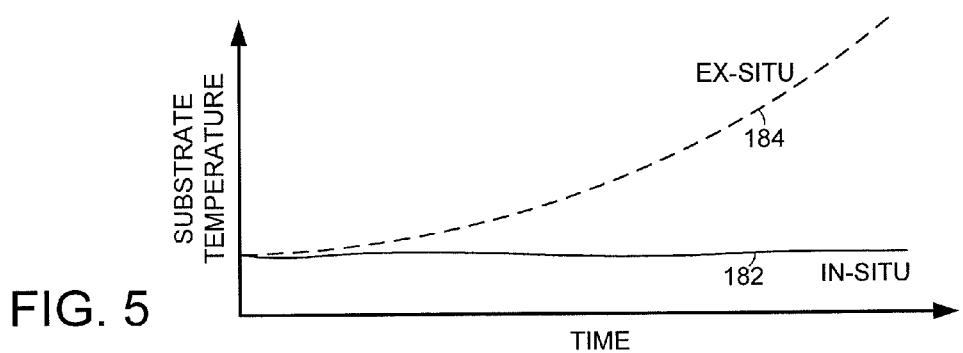
FIG. 5 is a graph of example fabrication data of substrate temperature comparing in-situ and ex-situ cryo-cooling processes.

FIG. 5 graphs data associated with ex-situ and in-situ cooling of a magnetic stack substrate as practiced in accordance with some embodiments. It is to be understood that in-situ cooling involves the in place, concurrent, cooling of a substrate to a cryogenic temperature while assorted layers of a data reader magnetic stack are formed atop the substrate. It is to be further understood that ex-situ cooling can be characterized as successive, non-concurrent, cooling of a substrate followed by deposition of portions of a data reader magnetic stack.

Solid line 182 represents an example in-situ substrate temperature profile over time. Segmented line 184 represents an example ex-situ substrate temperature profile over time. Substrates represented by lines 182 and 184 each are cooled to approximately a 90K cryogenic temperature, but the ex-situ line 184 diverges from the cryogenic temperature over time. Such temperature difference may be attributed to the in-situ substrate being continuously cooled through contact with cooling gas, which contrasts the ex-situ substrate that warms due to the combination of a room temperature ambient deposition environment and heat generated from the deposition of material particles.

The small variation of substrate temperature over time, such as less than 0.1° C., for in-situ cooling 212 illustrates how cooling can be controlled during magnetic stack formation to mitigate warming of the substrate. Conversely, it has been observed that ex-situ cooling 214 can have large substrate temperature fluctuations, such as more than 20° C., that can produce non-uniform substrate temperature distribution, varying magnetic material grain size, and increased interface surface roughness. It is contemplated that the respective variations in substrate temperature, 0.1° C. for in-situ and 20° C. for ex-situ, can also be found from wafer-to-wafer. That is, the observed temperature variation between numerous substrates cooled to cryogenic temperatures either with in-situ or ex-situ manners can respectively have relatively small or large temperature distributions at the time when magnetic stack layers are initially deposited onto the substrate.

Figure 6:
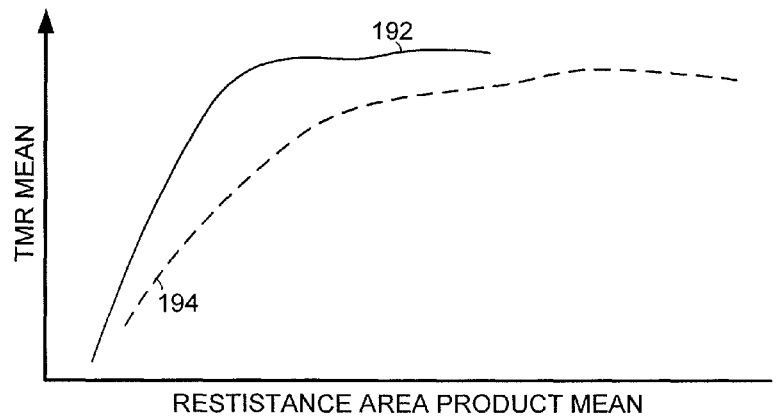
FIG. 6 plots data comparing tunnel magnetoresistance for data reader stacks constructed with in-situ and ex-situ cryo-cooling processes.

With the ability to consistently achieve a substrate temperature, such as 90K, and maintain that temperature over time, a magnetic stack formed atop an in-situ cooled substrate can experience optimized data reading performance that corresponds with smaller magnetic grains and reduced interlayer surface roughness. FIG. 6 plots operational data associated with data reader magnetic stacks fabricated with in-situ and ex-situ cooled substrates in accordance with various embodiments. Solid line 192 corresponds to the mean tunnel magnetoresistance (TMR) of an in-situ cooled substrate for various resistance area products while segmented line 194 represents TMR data for a data reader formed on an ex-situ cooled substrate.

Figure 7:
FIG. 7 is a graph of operational data showing MR/RA value comparisons between in-situ and ex-situ cryo-cooling process for data reader stacks.

FIG. 7 also conveys example operational data corresponding with data reader magnetic stacks constructed on in-situ and ex-situ cooled substrates, respectively. As shown, solid line 202 represents the magnetoresistance divided by resistance area product (MR/RA) value of an in-situ cooled substrate for various magnetic stack resistance area products. Segmented line 204 represents ex-situ substrate cooled magnetic stack MR/RA value for a variety of magnetic stack resistance area products.

It is contemplated that a TMR magnetic stack can be constructed with the reference structure opposite the barrier layer from the cooled substrate without significant alteration from the TMR and MR/RA value data conveyed in FIGS. 6 and 7. Comparison of the in-situ 192 and 202 performance data with respect to the ex-situ 194 and 204 data illustrates how continuous cooling of the substrate during magnetic stack formation can ensure the substrate is maintained at a cryogenic temperature and deposited materials have smaller grains and smoother interface surfaces versus ex-situ cooled substrates that warm during magnetic stack formation.

As a non-limiting quantification of the example performance data shown in FIGS. 6 and 7, the TMR of an in-situ deposited magnetic stack can have 5-50% increase compared to an ex-situ deposited magnetic stack, with each magnetic stack. Such data reading performance increases for in-situ substrate cooling can further be attributed to less interface diffusion and intermixing of magnetic stack layer materials. Regardless of the source of data reading performance optimization for in-situ magnetic stack formation, the data of FIGS. 6 and 7 supports how continuous cooling of a substrate to maintain a cryogenic substrate temperature during magnetic stack layer formation can tune the magnetic grain size of various magnetic stack layer to increase the magnetic stack's accuracy in reading data bits in high areal bit density data storage environments.

The utilization of in-situ substrate cooling can further optimize magnetic stack performance by reducing interlayer surface roughness, which corresponds with reduced magnetic free layer coupling across a barrier layer and higher breakdown voltage. In other words, reduced magnetic grains in a magnetic stack may be complemented by smoother interface surfaces in a magnetic stack that allow a barrier layer to be formed that optimizes interactions between two magnetically free layers in a trilayer magnetic stack or between free and reference layers in a TMR magnetic stack.

Figure 8:
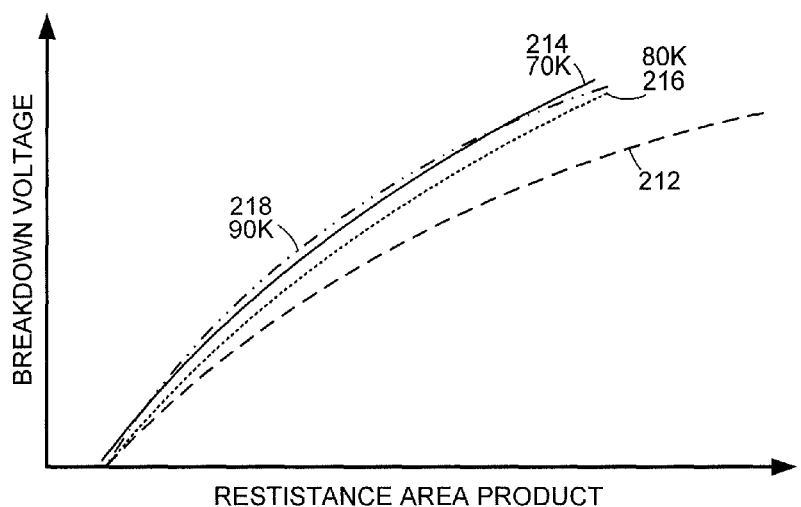
FIG. 8 plots operational data comparing breakdown voltages between in-situ cryo-cooling processes at different temperatures and ex-situ cryo-cooling processes for data reader stacks.

FIG. 8 displays data associated with magnetic stacks constructed in a variety of different substrate conditions in accordance with assorted embodiments. As shown, the breakdown voltage for a magnetic stack can change over a variety of different resistance area products for different cryogenic substrate temperatures. Segmented line 212 represents an ex-situ substrate cooling condition where substrate temperature gradient and substrate warming can have a reduced breakdown voltage compared to solid lines 214, 216, and 218 that respectively utilize in-situ substrate cooling at different cryogenic temperatures to increase breakdown voltage.

The ability to tune the substrate to a single cryogenic temperature, such as 80K, and vary between multiple different cryogenic temperatures, such as 70K and 90K, with in-situ substrate cooling allows various layers of a magnetic stack to be deposited with optimized parameters, such as magnetic grain size, onto surfaces with an optimized roughness, such as less than 0.2 nm.

Although not limiting, in-situ cryo-cooling and film deposition may be conducted in accordance with two different processes. First, a process cryo-cools a substrate to a cryo-temperature before depositing at least one film at the cryo-temperature in the same chamber. Second, a process pre-cools the substrate in a first chamber, which may only have cryo-cooling functions, before moving the substrate to a second chamber to further cryo-cool the substrate to a cryo-temperature prior to depositing at least one film at the cryo-temperature in the same chamber. The cryo-temperature can be a temperature of 150K or less, such as 100K or less and 50K or less.

One of the two in-situ cryo-cooling and film deposition processes can be applied to any number of magnetic layers of a magnetic stack, such as a first or second magnetically free layer, or applied to multiple magnetic layers, such as the first and second free layers of the tri-layer MgO TMR stack shown in FIG. 1A. The in-situ cryo-cooling and film deposition process can be applied to either a magnetically fixed or magnetically free layer. The in-situ cryo-cooling and film deposition process can be conducted concurrently on fixed and free magnetic layers, such as in the bottom pinned MgO TMR stack shown in FIG. 1B. The in-situ cryo-cooling and film deposition process can be applied to either free or fixed magnetization layers, or applied to both free and fixed layers in a top pinned MgO TMR stack.

The MgO barrier used in a TMR stack can be deposited at either room temperature or at an elevated temperature in accordance with various embodiments. The fixed and free layers in an MgO TMR stack can be single layers or laminations of multi-layers. The materials for the fixed and free magnetization layers can be, but are not limited to, Co, Fe, Ta, $CoFe_x$, $CoFe_xB_y$, $CoFe_xTa_y$, $CoFe_xB_yTa_z$, $NiFe_x$, $NiFe_xZr_y$, and $NiFexNb_y$. The cryo-cooling media used in the in-situ cryo-cooling and film deposition chamber can be He gas or other gases which have low liquidation temperature and are less active to deposited films. Such media can ensure the substrate wafer cools quickly and uniformly, which can optimize wafer-to-wafer uniformity, wafer-to-wafer repeatability, and wafer process throughput.

Figure 9:
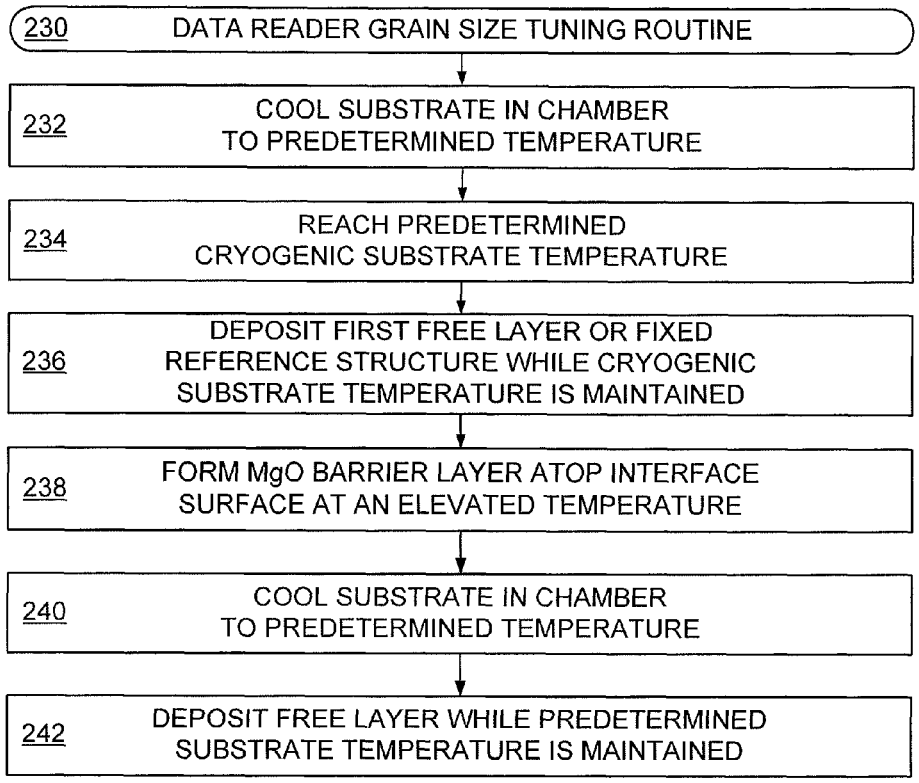
FIG. 9 provides an example grain size tuning routine that may be carried out in accordance with some embodiments.

FIG. 9 is a flowchart of an example data reader grain size tuning routine 230 that may be carried out in accordance with various embodiments to provide a data reader optimized for high areal bit density data storage environments. The routine 230 can begin by cooling a substrate to a temperature in step 232. In some embodiments, the substrate may be initially cooled in a first chamber, such as by the cooling chuck of FIG. 2A, for a relatively short time, like 1350 seconds, before being further cooled in a second chamber, such as chamber 142 of FIG. 3, by cooling gas during the deposition of one or more magnetic stack layers.

It is contemplated that step 232 performs in-situ cooling of the substrate in a common chamber with deposition means for approximately 900 seconds, such as 865 seconds. The ability to tune the cooling of a substrate prior to the deposition of a magnetic stack layer can allow for reductions in magnetic stack processing times and substrate temperature during magnetic stack formation. Reaching a cryogenic temperature, such as 90K, in step 234 advances routine 230 to step 236 where a magnetically free layer is deposited while the substrate is in-situ cooled and maintained at the cryogenic temperature. Deposition of the magnetically free layer in step 236 can correspond with a reduced magnetic grain size and surface roughness compared to ex-situ cooled substrates and room temperature deposited magnetic stack layers.

It should be noted that step 236 might form one or more layers of a fixed magnetization reference structure, such as structure 116 of FIG. 1B, instead of a magnetically free layer. With the magnetically free layer, or a reference structure, having a smooth interface surface and tuned magnetic grain sizes, an MgO barrier layer can be deposited in step 238 atop the interface surface after the substrate is allowed to warm to an elevated temperature, such as 200-300K. Formation of the barrier layer onto a relatively smooth surface, compared to a rough surface, can reduce magnetically free layer coupling across the barrier and optimize lattice matching between the magnetically free layer and barrier. The ability to tune the elevated substrate temperature at which the barrier layer is deposited can optimize magnetic interactions, and MR values, across the barrier layer.

Next, step 240 can actively cool the substrate to a reduced temperature, which may be between 50K-300K, before step 242 deposits at least one magnetically free layer atop the barrier layer. The reduced substrate temperature for depositing the free layer, compared to depositing the barrier layer, can provide reduced free layer grain size, grain size distribution, and resistance area product, which contrasts a free layer deposited onto a substrate that is at or near room temperature. It should be noted that the tuning of substrate temperature for different layers of a data reader can provide optimized performance compared to a data reader deposited on a substrate continually kept at a consistent temperature. The cooling of a substrate in step 240 for the deposition of data reader layers separated from the substrate also allows for tuned data reader performance gains in the form of grain size, interlayer coupling, and resistance area product.

The active, in-situ, cooling of the substrate during steps 236 and 242 contrasts ex-situ substrate cooling where a substrate is continually warming during the deposition of data reader layers. It can be appreciated that such ex-situ deposition would correspond with higher free layer grain sizes and reduced data reader performance compared to the maintenance of a cooled substrate temperature in step 240. The ability to actively maintain cooled substrate temperatures provides increased substrate temperature uniformity and allows for the optimization of magnetic interactions across the barrier layer between the magnetic layer formed in step 236 and the magnetic layer deposited in step 240.

Various embodiments may utilize routine 230 to tune the in-situ substrate cooling to optimize the magnetic grain size and interface surface roughness of the various magnetic and barrier layers of a magnetic stack. That is, routine 230 can be employed to construct a trilayer or TMR magnetic stack that has magnetic and barrier layers deposited with similar or dissimilar substrate temperatures, interface surface roughness, and magnetic grain sizes to minimize interface diffusion and material intermixing, reduce ferromagnetic coupling, and increase breakdown voltage and TMR.

Although the various steps of routing 230 can produce a magnetic stack with tuned grain sizes and increased data reading performance, the aspects of routine 230 are not required or limiting. As such, assorted steps and decisions can be added, modified, and omitted from routine 230 without deterring from a data reader having an optimized magnetic stack. For example, a decision may be added to routine 230 to determine what type of magnetic stack is to be formed, such as a trilayer or TMR stack. One or more additional decisions may also determine the position of a fixed magnetization structure relative to an in-situ cooled substrate, such as above or below the barrier layer with respect to the substrate.

Figure 10:
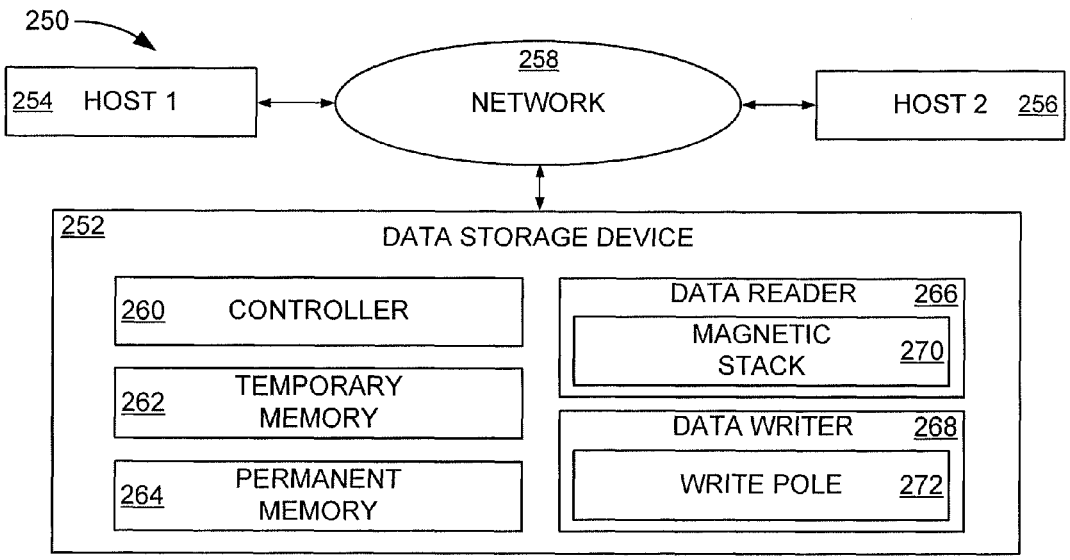
FIG. 10 is a block representation of an example portion of a data storage system configured and operated in accordance with various embodiments.

FIG. 10 displays a block representation of a portion data storage system 250 in which various embodiments may be practiced. It is noted that the system 250 shown in FIG. 10 is not comprehensive, required, or limiting as assorted aspects may be changed, added, and removed at will. The system 250 may have one or more data storage devices 252 that can individually, concurrently, and collectively be accessed by at least first 254 and second 256 remote hosts, such as nodes, servers, computing clouds, and other data storage devices, by wired and wireless networks 258. The ability to connect to remote hosts 254 and 256 allows the data storage device 252 to be utilized locally and incorporated into mobile computing systems.

The data storage device 252 may have one or more local controllers 260, such as a microprocessor and application specific integrated circuit (ASIC). A local controller 260 may dictate access to and from at least one temporary memory 262 and permanent memory 264. That is, a local controller 260 can program data to and retrieve data from a temporary memory 262, such as a volatile dynamic random access memory (DRAM), and a permanent memory 264, such as a non-volatile solid-state array or rotating data storage medium. For example, the local controller 260 can store incoming data in the temporary memory 262 for a short time before moving the data to the permanent memory 264 at a time, such as low data processing and device sleep conditions.

The controller 260 may employ a data reader 266 and a data writer 268 to selectively program and sense data from data bits in the temporary 262 and permanent 264 memories. It is contemplated that multiple data accessing means, such as data readers 266 and writers 268 may be utilized in a single data storage device 252 either individually or concurrently. Although not limiting, the data reader 266 can have a magnetic stack 270 that can be configured as a lamination of layers that are sensitive to encountered data bits and provide an MR response. The data writer 268 is not limited by, but may contain, at least one write pole 272 to emit magnetic flux and establish a magnetic circuit through a data storage medium that writes a data bit as a selected magnetic polarity.

Raising the areal bit density of data bits on a data storage medium may increase the data storage capacity of the data storage device 252. Such heightened areal bit density can correspond to data bits that are physically smaller and/or closer together on the data storage medium. While increased data storage capacity may be attained, increased areal bit density can pose difficulties for accurately programming data with the data writer 268 and retrieving data with the data reader 266 without reducing the physical size of the magnetic stack 270 and write pole 272, respectively.

By incorporating in-situ cooling of a substrate to cryogenic temperatures while magnetic stack layers are formed, a variety of data reading characteristics can be optimized through reduction of magnetic grain sizes and interface surface roughness. First, data reader signal-to-noise ratio and bit error rate can be optimized through an increase in TMR and MR/RA values. Second, smoother interface surfaces can provide a barrier layer with better lattice matching with adjacent magnetic layers to reduce ferromagnetic coupling, interlayer diffusion, and material intermixing. Third, increasing breakdown voltage across a barrier layer can optimize data reader readability. Finally, in-situ substrate cooling can provide heightened process control and more consistent substrate temperature uniformity, which reduces magnetic asymmetry and decreases magnetic stack processing time compared to magnetic stack formation onto ex-situ cooled or room temperature substrates.

While the embodiments herein have been directed to a data reader for a rotating data storage device, it will be appreciated that the various embodiments can readily be utilized in any number of other applications, including solid-state data storage applications. It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. A method comprising:
   cooling a substrate to a first temperature of 100K or lower;
   forming a first layer of a data reader on the substrate while the substrate is actively cooled to maintain the substrate at the first temperature throughout the deposition of the first layer;
   depositing a second layer of the data reader on the first layer while the substrate is actively cooled to maintain the substrate at the first temperature;
   creating an interface layer on the second layer after the substrate is warmed to a second temperature above 200K; and
   depositing a magnetically free layer of the data reader on the substrate while the substrate is actively cooled to maintain the substrate at the first temperature throughout the deposition of the at least one layer to provide a tuned microstructure, the tuned microstructure comprising a grain size, grain size distribution, interface quality between multiple layers of the data reader, resistance-area product, and magnetoresistance.

2. The method of claim 1, wherein the first temperature of the substrate is maintained during the deposition of a fixed magnetization reference layer and/or the magnetically free layer of the data reader.

3. The method of claim 1, wherein the substrate is maintained at different first and second cryogenic temperatures respectively during deposition of multiple different layers of the data reader.

4. The method of claim 1, wherein the at least one layer of the data reader comprises a magnetic layer with an interface surface, the interface surface having a roughness of 0.25-0.35 nm.

5. The method of claim 1, wherein the substrate houses a plurality of separate data readers concurrently.

6. The method of claim 1, wherein the substrate is cooled via contact with a cooling gas, the cooling gas isolated to a half of the substrate by a sealed bifurcation in a chamber.

7. The method of claim 6, wherein the half of the substrate is opposite a deposition surface where the at least one layer is deposited.

8. The method of claim 6, wherein the cooling gas is positioned between the substrate and a chuck, the chuck being separated from the substrate.

9. The method of claim 6, wherein the cooling gas is injected into the chamber during deposition of the at least one layer.

10. The method of claim 6, wherein the chamber contains multiple different types of deposition means.

11. A method comprising:
    cooling a substrate to a cryogenic temperature of 100K or lower in a first chamber;
    depositing a first layer of a data reader on the substrate in a second chamber while the substrate is actively cooled to maintain the substrate at the cryogenic temperature to provide a tuned microstructure;

forming a second layer of the data reader atop the first layer while the substrate is actively cooled to maintain the substrate at the cryogenic temperature to provide a smooth surface roughness at an interface between the first and second layers;

creating an interface layer atop the second layer after the substrate has warmed to an elevated temperature of 200K of greater; and depositing a magnetically free layer atop the interface layer after the substrate is cooled to the cryogenic temperature, the substrate maintained at the cryogenic substrate throughout the deposition of the magnetically free layer.

12. The method of claim 11, wherein a cryo-cooling gas contacts the second surface of the substrate while each of the plurality of layers of the data reader are deposited.

13. The method of claim 11, wherein a plurality of layers are successively deposited atop one another while the substrate is maintained at the cryogenic temperature, the plurality of layers form a magnetic stack.

14. The method of claim 11, wherein cooling and depositing steps are conducted concurrently.

15. An apparatus comprising a data reader positioned on a substrate and comprising a first layer, second layer, interface layer, and magnetically free layer successively stacked, the first, second, and magnetically free layers each having a tuned microstructure in response to the substrate being actively cooled during deposition to maintain the substrate at an initial temperature of 100K or lower, the interface layer positioned atop the second layer and formed after the substrate is warmed to an elevated temperature of 200K or greater, the tuned microstructure comprising a grain size, grain size distribution, interface quality between multiple layers of the data reader, resistance-area product and magnetoresistance.

16. The apparatus of claim 15, wherein the magnetic stack lamination is a magnetoresistance element with a fixed magnetization on an air bearing surface (ABS).

17. The apparatus of claim 15, wherein the temperature is 50K or lower.

18. The apparatus of claim 15, wherein at least one layer of the data reader comprises one of the following: Co, Fe, Ta, $CoFe_x$, $CoFe_xTa_y$, $CoFe_xB_yTa_z$, $NiFe_x$, $NiFe_xZr_y$, and $NiFe_xNb_y$.

* * * * *